(12) United States Patent
Sciortino

(10) Patent No.: US 6,634,823 B2
(45) Date of Patent: Oct. 21, 2003

(54) TRUSS UNION CONNECTOR & TRUSS MOUNT

(75) Inventor: Michael Sciortino, 625 Locust St., Garden City, NY (US) 11530

(73) Assignee: Michael Sciortino, Baldwin, NY (US)

( * ) Notice: Subject to any disclaimer, the term of this patent is extended or adjusted under 35 U.S.C. 154(b) by 57 days.

(21) Appl. No.: 10/052,670

(22) Filed: Jan. 18, 2002

(65) Prior Publication Data

US 2003/0138293 A1 Jul. 24, 2003

(51) Int. Cl.⁷ .................................................. F16B 7/04
(52) U.S. Cl. ....................... 403/13; 403/344; 403/374.3; 403/286; 403/408.1
(58) Field of Search .................... 52/726.1; 403/396, 403/344, 374.3, 374.2, 374.1, 373, 286, 293, 287, 408.1, 13, 14; 256/13.1

(56) References Cited

U.S. PATENT DOCUMENTS

| | | | | |
|---|---|---|---|---|
| 2,794,660 A | * | 6/1957 | D'Azzo ...................... 403/190 |
| 5,769,556 A | * | 6/1998 | Colley ......................... 403/24 |
| 6,409,156 B2 | * | 6/2002 | Dent ......................... 256/13.1 |
| 2002/0037193 A1 | * | 3/2002 | Gibbons et al. ............ 403/344 |

* cited by examiner

Primary Examiner—Lynne H. Browne
Assistant Examiner—John Cottingham
(74) Attorney, Agent, or Firm—Amster, Rothstein & Ebenstein (57) ABSTRACT

A truss union connector for releasably coupling the ends of two axially aligned pipes, where the connector has simple construction and is operable easily and quickly by actuating a simple knob. This truss union connector is optionally combined with a truss mount where one of the coupled pipes is mounted to a truss. The connector includes a set of split cylindrical shell segments that engage outer surfaces of the ends of the coupled pipes by dimples extending radially inward from the split shell segments into holes in the walls of the pipe surfaces, resulting in a secure but rapid coupling and de-coupling assembly.

14 Claims, 7 Drawing Sheets

TRUSS UNION CONNECTOR & TRUSS MOUNT

BACKGROUND OF THE INVENTION

This invention is in the field of union connectors for releasably coupling the ends of two pipes and of a combination of a union connector and a truss mount which is releasably connectable to a truss, such union connectors being commonly used to support lighting fixtures from overhead horizontal trusses or from vertical trusses.

Truss union connectors, particularly in combination with truss mounts, are used commonly to support lighting fixtures used in trade shows, theaters, clubs or other environments. In many of these situations time is critically important as during installation or assembly and disassembly when sets are changed during a theatre production or where displays are set up or removed at trade shows.

Often at theater and trade show sites there is shortage of tools during the set-up or change-over transitions. Thus, it is desired to have the simplest connector structures which are quick and easy to use, and reliable. Some prior art structures focus primarily on accuracy or positioning and security of attachment, and unfortunately produce structures that are complex in terms of components and manufacture and either difficult and/or time-consuming to use. Typically, in prior art structures, achievement of one objective often dictates failure of another. For example, many prior art structures utilize bolts as the basic fastening elements which usually extend transversely and completely through a pipe perpendicular to its axis, as seen in U.S. Pat. No. 6,030,142, U.S. Pat. No. 5,184,911, U.S. Pat. No. 4,901,970, U.S. Pat. No. 5,609,436, and U.S. Pat. No. 5,536,102. While these prior art patents are primarily for coupling a pipe to another structure as opposed to coupling two pipes in end-to-end orientation, and while they may allege to be simple and easy to use and suitable for rapid installation, each disclosure has either multiple parts or a design which not suitable for easy and quick use in an awkward overhead position. As indicated above, bolts and pins in prior art devices invariably extend fully through the connected elements, thus necessitating more time and dexterity to assure proper orientation of components and full engagement and subsequent disengagement. This is both frustrating and costly where assembly or disassembly takes extensive time while subsequent phases must wait.

The relevant prior art concerns not only truss union connectors for removable attachment of pipe extension components of lighting fixtures and the like to existing pipe elements, but also to truss mounts for removable attachment of these truss union connectors to trusses which include common ladder type and triangular type trusses and other related structures.

SUMMARY OF THE INVENTION

This invention is a connector for releasably coupling the ends of two axially aligned pipes, where the connector has simple construction and is operable easily and quickly by actuating a simple knob. This connector is optionally combined with a truss mount where one of the coupled pipes is mounted to a truss. The new connector includes a set of split cylinder shell segments that engage the outer surfaces of the ends of the coupled pipes. These shells engage the pipes easily, quickly and securely primarily by use of short dimples that extend from the bore surface of the split cylinder shell segments radially inward into holes in the walls of the pipes. Numerous variations of this coupling concept are possible such as dimples extending radially outward from the pipes into holes in the shell segments. For convenience of manufacture the holes may extend completely through the pipe or shell wall respectively, or the holes may be replaced with shallow recesses or grooves in the surface receiving the dimples or other projections.

It is an object of this invention to provide a coupling which is simple to manufacture and to operate, and which can be assembled and disassembled very quickly and easily even in overhead or other awkward positions.

It is a further object to have a coupling assembly which is integrated such that its components will not fall apart while the unit is being used to join pipes. In one embodiment the coupling assembly is fixed in part to a first pipe end and adaptable to receive and releasably engage the end of another pipe. Such assembly is readily operable to receive the second pipe and easily closable into a secure coupling while the components are not able to fall apart or become mis-oriented. In one preferred embodiment the coupled pipes are coaxial and of the same diameter; however, in other embodiments the pipes may be non-coaxial and of different diameters.

A still further object is to combine this coupling assembly with a truss mount which is releasably connectable to a ladder truss, triangular truss or other structure and simultaneously serves to couple ends of two aligned pipes.

An additional object is for the assembly to be operable by rotation of a single thumbscrew. In one embodiment the thumbscrew, when initially turned, rotates the thumbscrew shaft into a distal nut where the shaft locks; further rotation of the thumbscrew causes the thumbscrew to move axially on the shaft and drive the shells tightly against the coupled pipes.

A further embodiment utilizes a set of split cylinders or shells which when assembled into a connector define a split cylinder separated by a central axial plane. The shells when assembled define an outer cylinder concentric about the adjacent ends of the end-to-end pipes, and each shell overlies said opposing pipe ends. These pipe ends are slightly spaced apart, and a bolt fastener extends transversely through and engages said two shells and extends between the terminal ends of said adjacent but spaced apart pipe ends. To retain said pipe ends from moving axially away from each other, each pipe end has at least one set of holes extending radially inward and situated axially inward from its terminal end, and each shell has extending from its base surface two axially spaced dimples extending radially inward. In use one shell has one dimple extending through the radial hole of one pipe and the other dimple extending through the radial hole of the other pipe, these transverse projections from the shells into the pipes serving to bar axial displacement of the pipes relative to each other. The second shell has two generally similar inward projections except that one is a dimple for releasably coupling to one pipe and the other projection is a bolt or rivet permanently securing the shell to the end of one pipe. The transverse central bolt, preferably has at its top end a socket head drivable by an Allen wrench with external threads for cooperation with a wing nut, and at its bottom end threads to engage a nut or other threaded receptacle.

DETAILED DESCRIPTION OF THE PREFERRED EMBODIMENT

Figure 1:
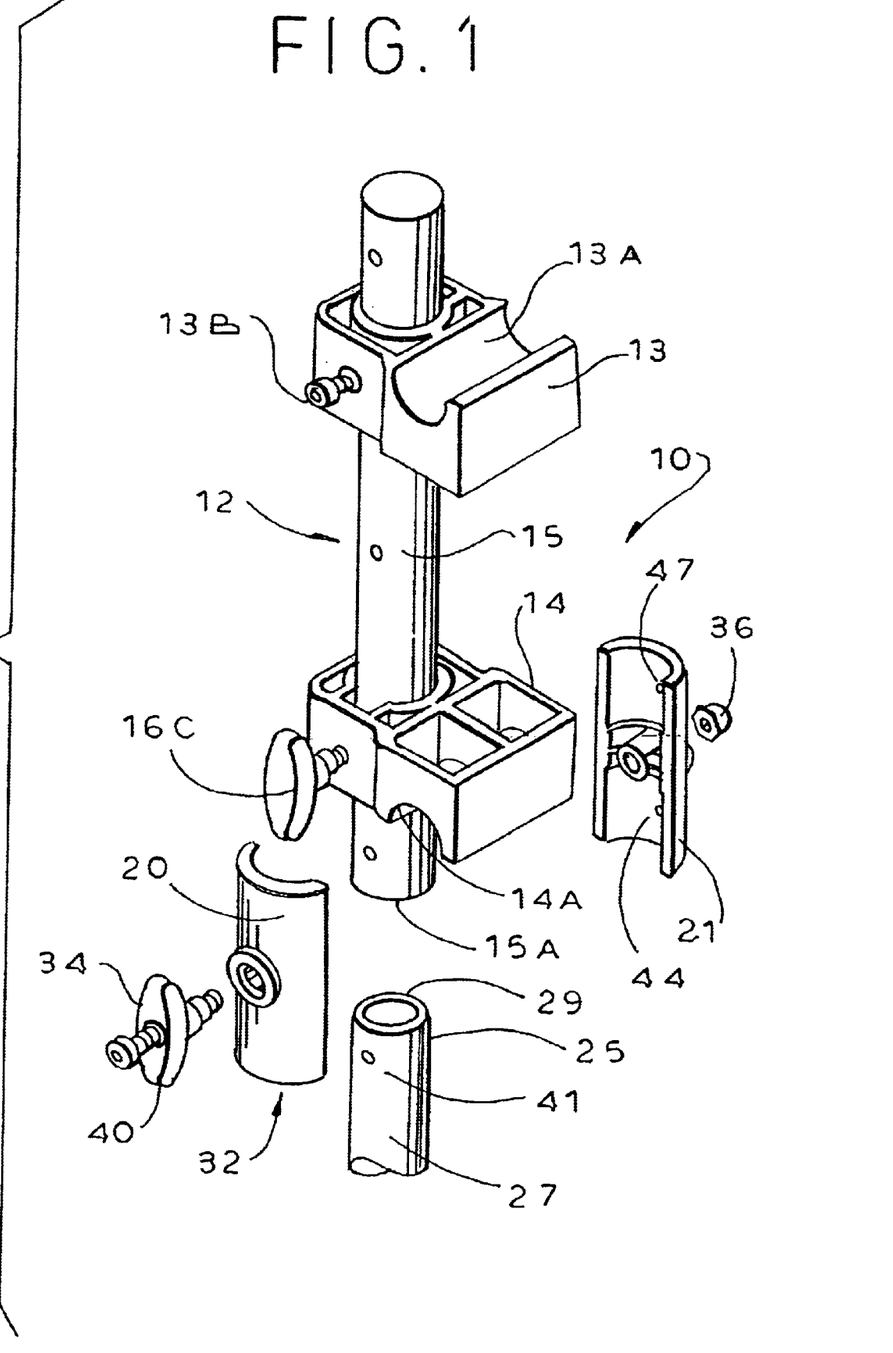
FIG. 1 is an assembly in exploded perspective view of the new truss union connector in combination with a truss mount.
Figure 2:
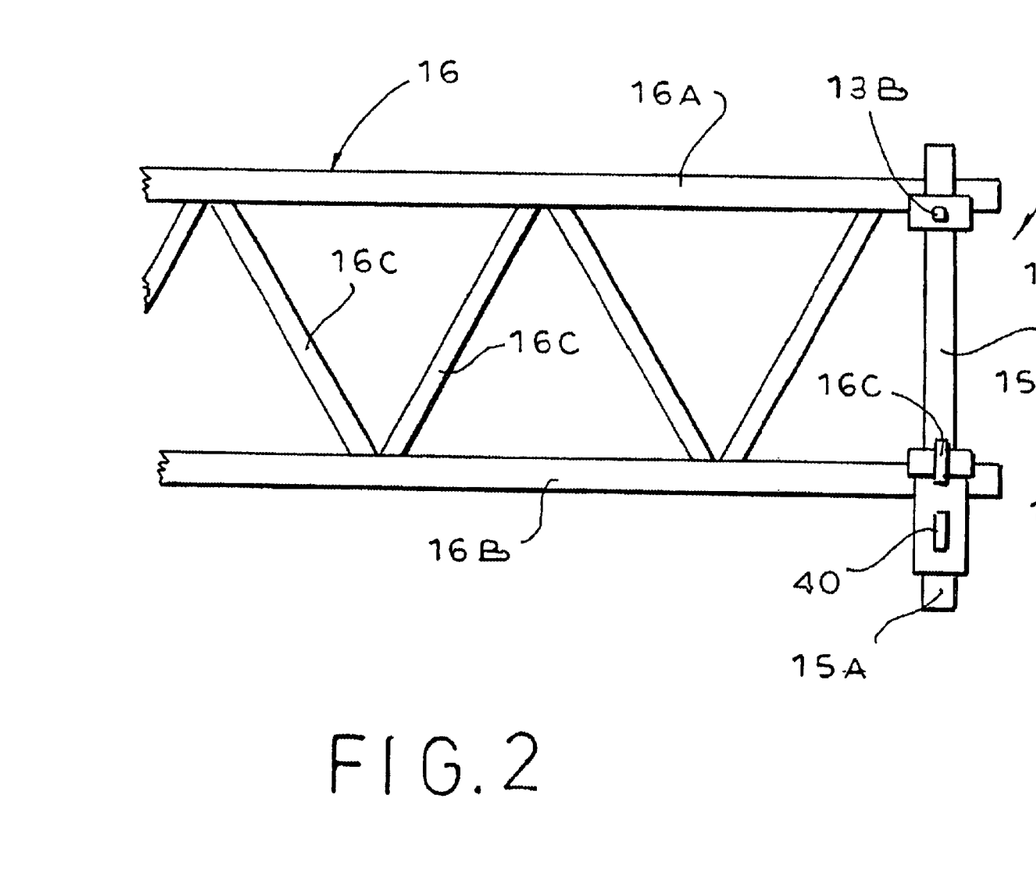
FIG. 2 is a front elevation view of a fragmentary ladder truss with the combination truss connector and truss mount secured thereto.

The drawings disclose an illustrative embodiment of the present invention which serves to exemplify the various advantages and objects hereof, and are as follows:

FIG. 1 shows in exploded view an assembly 10 of a truss union connector 11 in combination with a truss mount 12. The truss mount is formed of upper saddle part 13 and lower saddle part 14 situated on junction post 15. In use the truss mount 12 is releasably secured to a ladder truss 16, as seen in horizontal orientation in FIGS. 2 and 3 or to another form of truss which may be oriented vertically, horizontally or otherwise. This truss mount will be described in further detail later below.

The union connector 11 as seen in FIGS. 1–7 is formed from a set of shells, left shell 20 and right shell 21, which together define a split cylinder 22 (seen in FIGS. 6 and 7) cut by an axial plane into the two half or slightly less than half-cylinders 20, 21. When assembled together, these shells form the split sleeve 22 situated closely and concentrically about the ends 24, 25 of two axially aligned pipes 26, 27 respectively. These pipes are axially aligned about a central axis and have terminal ends 28, 29 respectively which are adjacent, end-to-end. These pipe ends 28, 29 are spaced apart a distance sufficient to allow for the central fastening sub-assembly 32, which includes a threaded bolt 34, an acorn nut 36 which fits into a recess 38 dimensioned to prevent rotation of nut 36, and thumbscrew 40 threadedly engaged to bolt 34.

Figure 4:
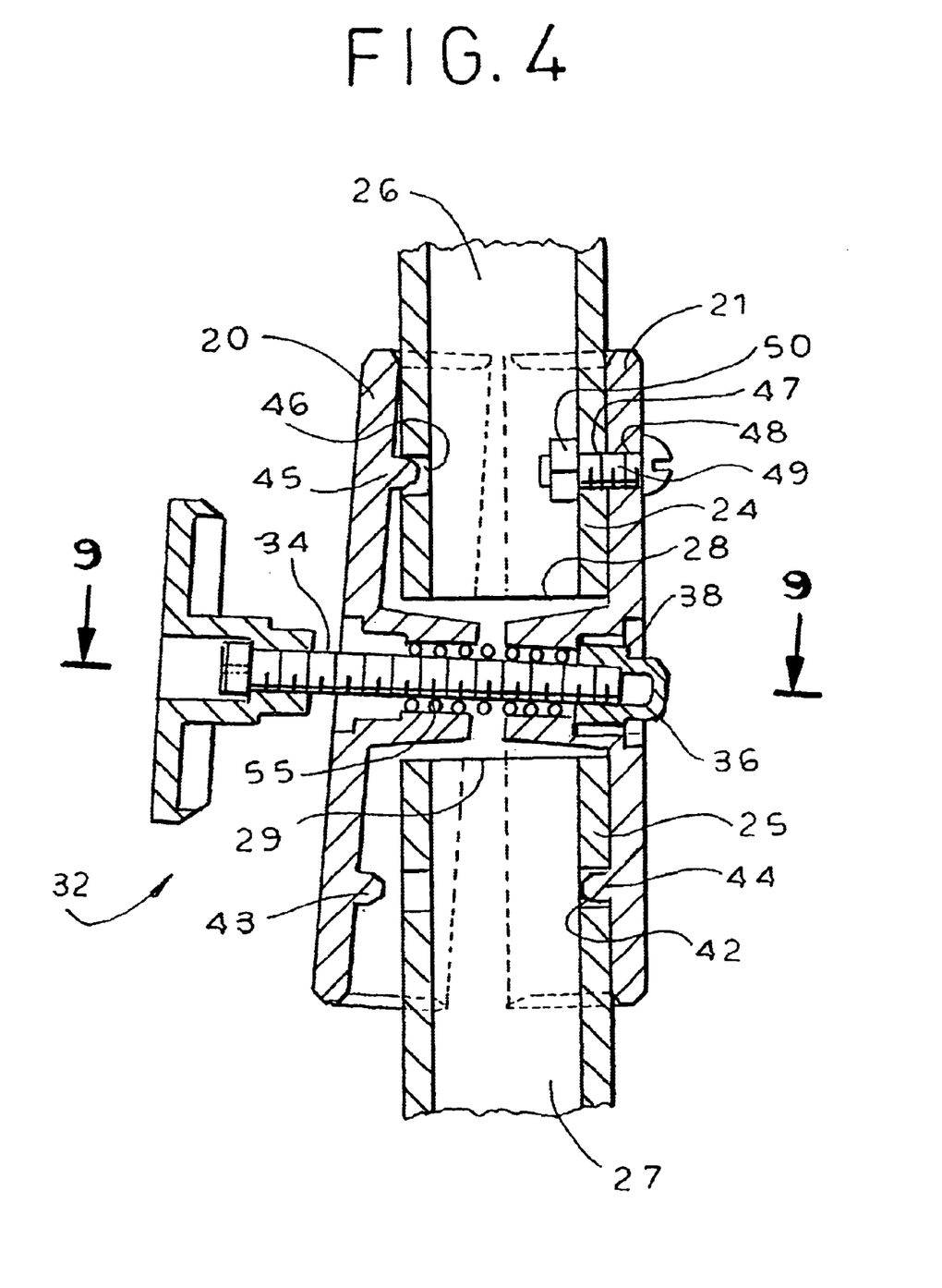
FIG. 4 is a sectional view of the truss connector of FIGS. 1 and 2 in open condition.
Figure 5:
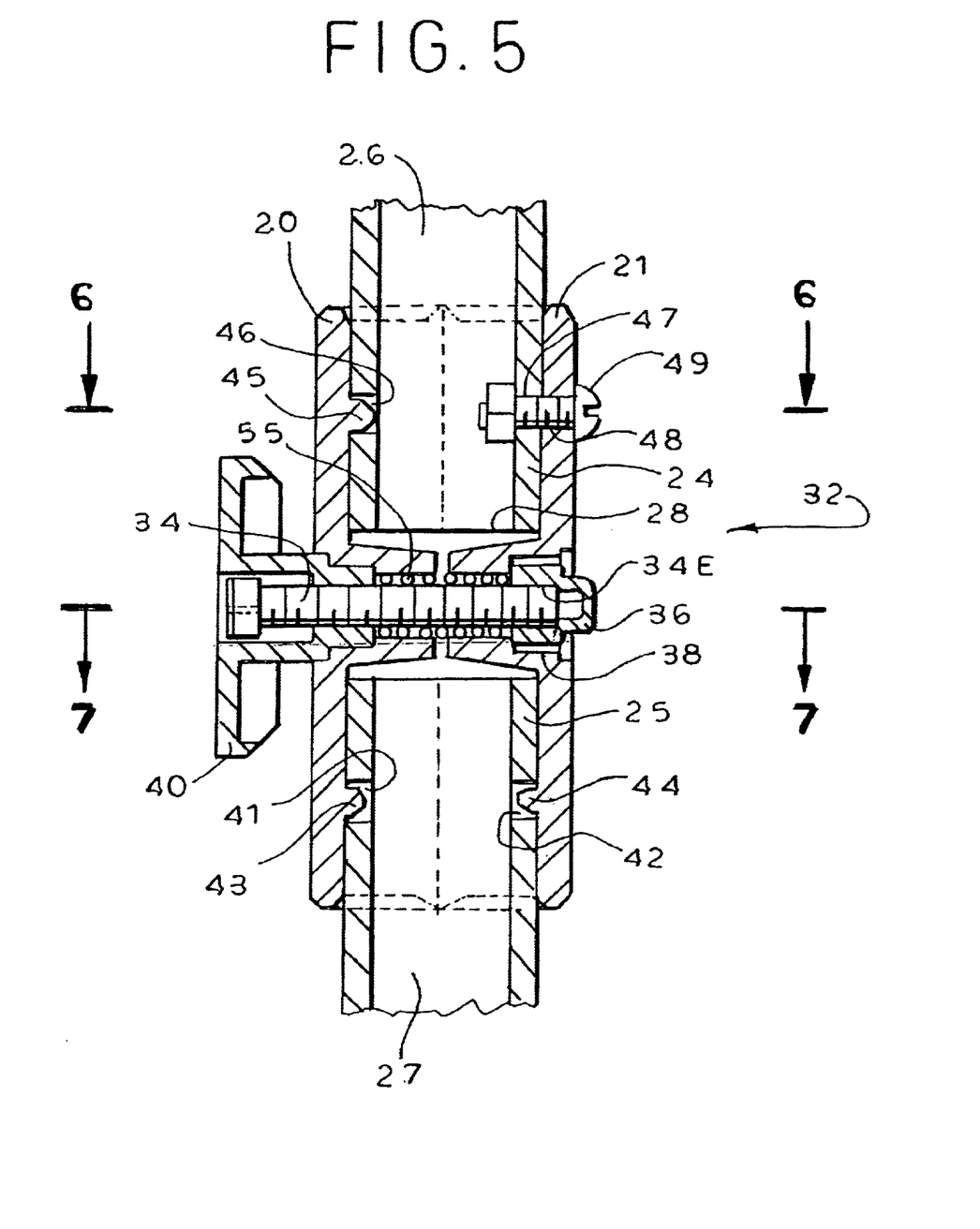
FIG. 5 is a sectional view of the truss connector of FIGS. 1, 2 and 5 in closed condition.

As seen in FIGS. 4 and 5, lower pipe 27 has opposite radial holes 41, 42, and left and right shells 20, 21 respectively have radial dimples 43, 44 which are dimensioned and situated to fit into holes 41, 42 when the shells are closed. This radially-extending dimple-to-hole connection in the closed condition seen in FIG. 5 locks the lower pipe 27 to the coupling and prevents relative axial displacement. The upper end of sleeve 20 has a similar dimple 45 which fits into hole 46. It is significant to note that FIG. 4 shows the shells 20, 21 in open condition somewhat like an open alligator mouth that easily receives the end 29 of pipe 25 and then recloses as seen in FIG. 5 and is locked by simple rotation of thumbscrew 40.

Figure 6:
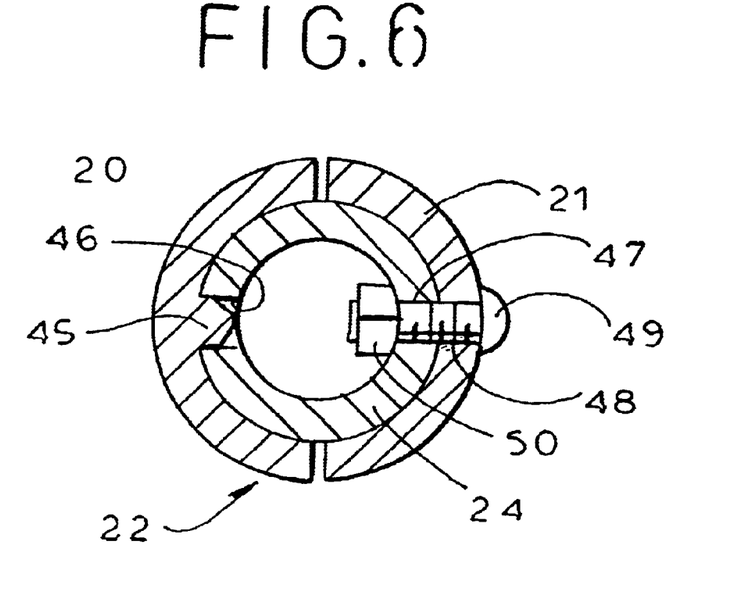
FIG. 6 is a sectional view taken along line 6—6 in FIG. 5, showing one fixed fastener and one dimple-in-hole arrangement.

Also, as seen in FIGS. 4, 5, and 6 the upper pipe 26 has addition lock hole 47 aligned with and radially opposite dimple 45, and right shell 21 has lock hole 48 that aligns with lock hole 47, and bolt 49 extends through both holes 47 and 48 and is fixedly secured by nut 50. Bolt 49 could be replaced by a rivet or by adhesive or other fastening means, since the object is to fixedly secure one of the shells to one of the pipes being coupled.

As seen in FIG. 4 the right shell 21 is secured to upper pipe 26, and left shell 20 is displaced angularly from the coupled right shell and pipe 26, while left shell 20 is prevented from totally separating or falling apart from the right shell 21 by the central bolt 34 whose bottom end 34B is threadedly engaged to nut 36.

In operation the shells 20 and 21 are partially separated until there is sufficient space for lower pipe 27 to be moved axially upward into the recess of base formed by shells 20 and 21. As an option, shell 20 could be displaced laterally without angulation. Hole 42 in pipe 27 slips onto dimple 44 of the right shell, and then the central bolt is operated, as described in greater detail below, to pull shell 20 transversely toward shell 21 until dimple 43 slips into hole 41, and dimple 45 slips further into hole 46, and the two left and right sleeves become snugly fitted onto pipes 26 and 27.

Figure 7:
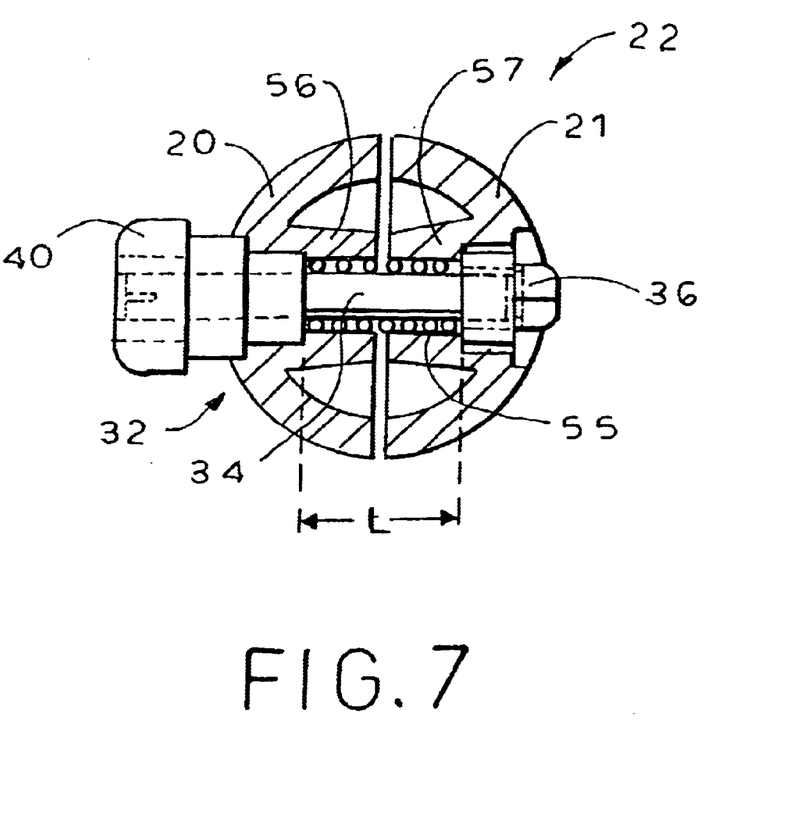
FIG. 7 is a sectional view taken along line 7—7 in FIG. 5, showing the central bolt.

A coil spring 55 seen in FIGS. 4, 5 and 7 has relaxed length greater than the space L, seen in FIG. 7 between bosses 56, 57 of shells 20 and 21. Thus, as the bolt 34 is loosened by thumbscrew 40, the coil spring 55 urges the shells apart, with the result that they separate by themselves and thus easily provide the space between them to receive the lower pipe for coupling as described above.

When the coupling begins and after the lower pipe is inserted and engages the dimples 43 and 44, the initial rotation of thumbscrew 40 causes rotation of bolt 34 whose end 34E is drawn into the acorn nut 36, pulling shell 21 snugly toward pipe 21. Further rotation of thumbscrew 40 rotates bolt 34 which forces shell 20 also into a tight fit against pipes 26, 27.

From this structural arrangement there are numerous benefits. First, this assembly allows coupling of two pipes that can be done easily and quickly. Since one shell, namely 21 is initially secured to one pipe 26, and since the left shell 20 is loosely coupled to the right shell 21 by central bolt 34, which is also coupled to the left shell, the assembly components will not fall apart or become inoperably displaced when coupling is begun.

Second, the coil spring or other separation means automatically urges the shells into an open condition feasible to receive the second pipe, which is lower pipe 27 in the case herein illustrated. Thus, the lower pipe 27 can be easily, quickly and securely captured by the shells.

Third, the thumbscrew permits an easy and rapid final tight lock; the thumbscrew 40, 34 in combination with the coil spring 55 further permits an easy and rapid disassembly since the shells will pop open from the spring until the dimples withdraw from the holes 41, 42 in the lower pipe.

Fourth, the very simple dimple-hole combination allows extremely quick coupling and decoupling without any binding or unhooking, so that lighting fixtures or other components can be positioned and secured and subsequently removed with no requirement of special tools or of any tools, and no special skills or experience, and with little expenditure of time, energy or other cost.

Fifth, the parts are simple and inexpensive to manufacture and components, if damaged, can be easily replaced.

Sixth, the thumbscrew and central bolt can be designed and adapted to provide a warning stop when adequate tightening has been achieved.

Figure 3:
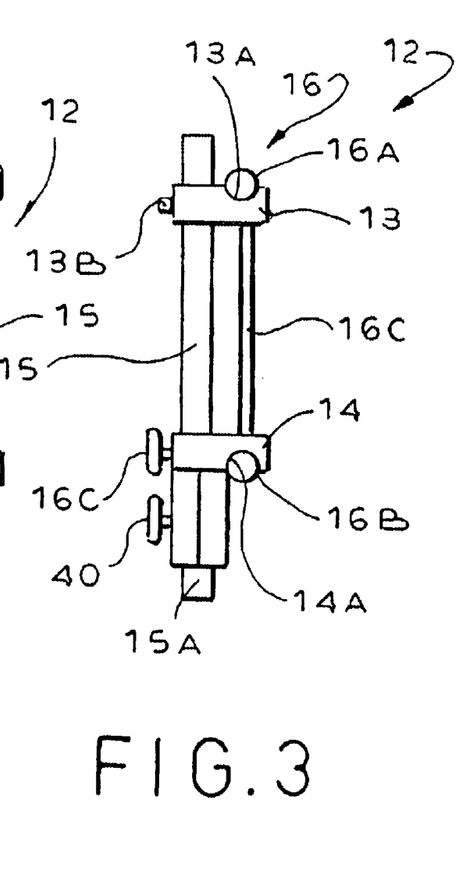
FIG. 3 is an end elevation view of FIG. 2.

The truss mentioned earlier is seen is FIGS. 2 and 3 is a ladder truss 16 which is generally flat, with upper and lower rails 16A, 16B, and inclined support struts 16C. The upper and lower saddles 13, 14 each have a concave or cylindrical surface 13A, 14A as seen in FIGS. 1 and 3 for engagement with the upper and lower rails 16A, 16B formed in this case from round pipes. For convenience of use, upper saddle 13 is locked in place on post 15 by set screw 13B, and lower saddle 14 is slidable on post 15 until it simply engages lower rail 16B, at which time its thumbscrew 16C is tightened to lock the lower saddle in place and thereby to releasably lock the truss mount 12 onto truss 16. In the embodiment shown in FIGS. 1–3 the lower end 15A of post 15 corresponds to the upper pipe 26 in FIGS. 3–7. The lower pipe 25 in FIG. 1 utilizes the same reference numbers as used in FIGS. 4–7, namely, terminal end 29 and hole 41.

Figure 8:
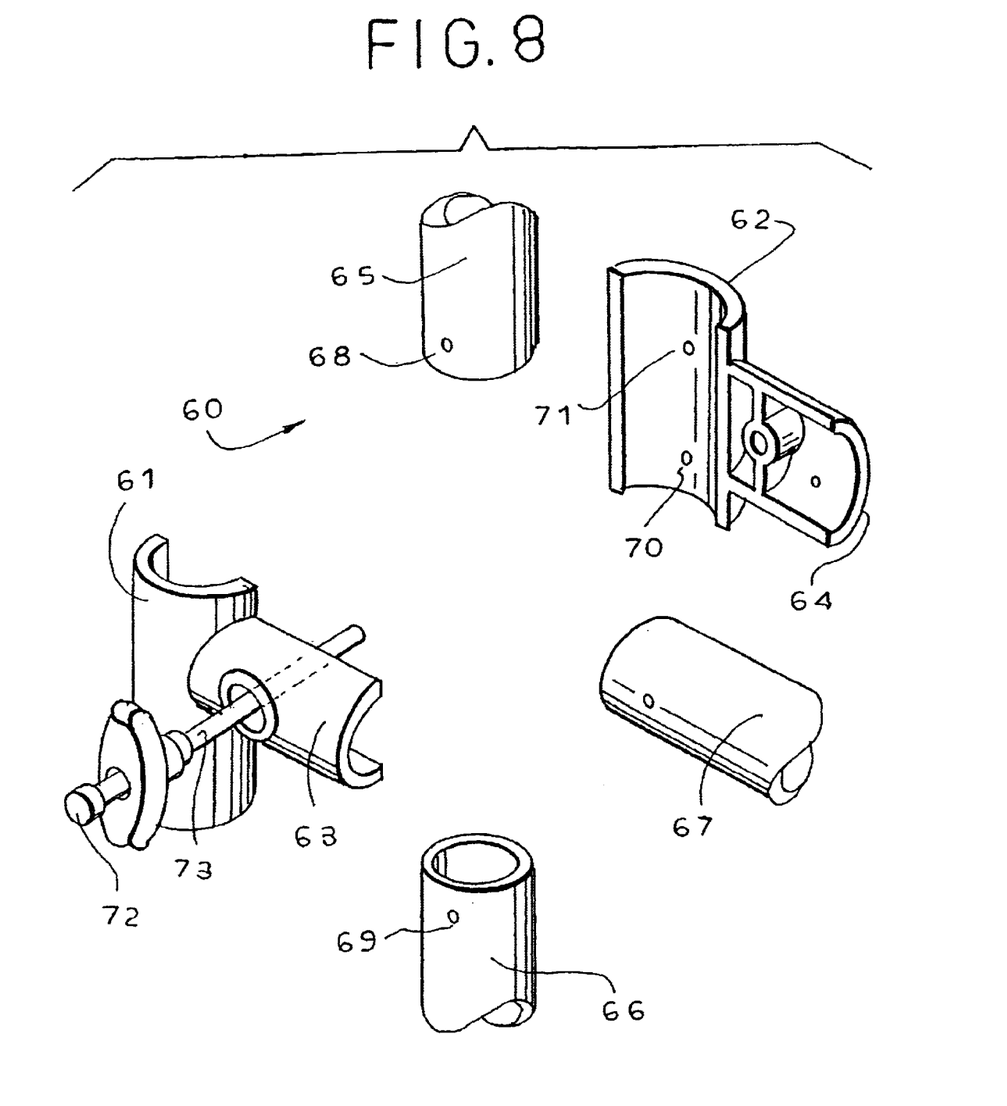
FIG. 8 is an assembly in exploded perspective view of a second embodiment of the truss connector in a T-configuration for releasably coupling a simple pipe end to a transverse pipe.

FIG. 8 shows a T-configuration variation 60 of the present invention where the set of shells 61, 62 forming the split cylinder include right angle portions 63, 64 for coupling aligned pipe ends 65, 66 and transverse pipe end 67. Structural features of this embodiment are essentially the same as corresponding parts in FIGS. 1–7. Shell 61 has a pair of dimples (not seen) which engage holes 68, 69 in pipes 65, 66. Shell 62 has a dimple 70 and a hole 71 for fixedly joining shell 62 to pipe end 65. Shell 61 further includes thumbscrew 72 and its threaded shaft 73 which corresponds to the similar releasable fastening means in FIGS. 1–7. As evident, this embodiment can provide quick and secure releasable connection of two or three pipes.

Figure 9:
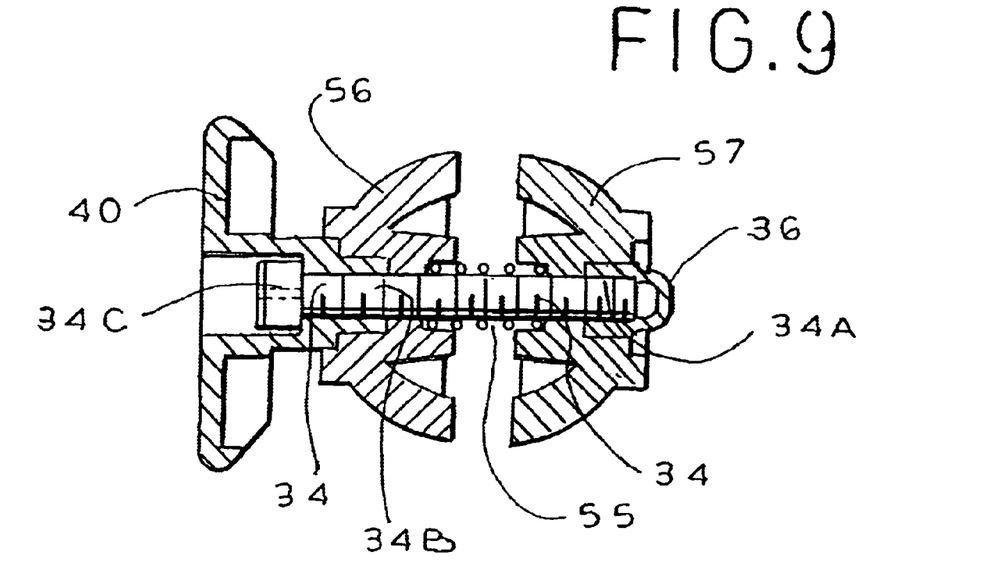
FIG. 9 is a sectional view taken along line 9—9 in FIG. 4 showing a more detailed view and variation of the molded bosses in the split cylindrical shells, through which the central fastening bolt extends, in open condition.
Figure 10:
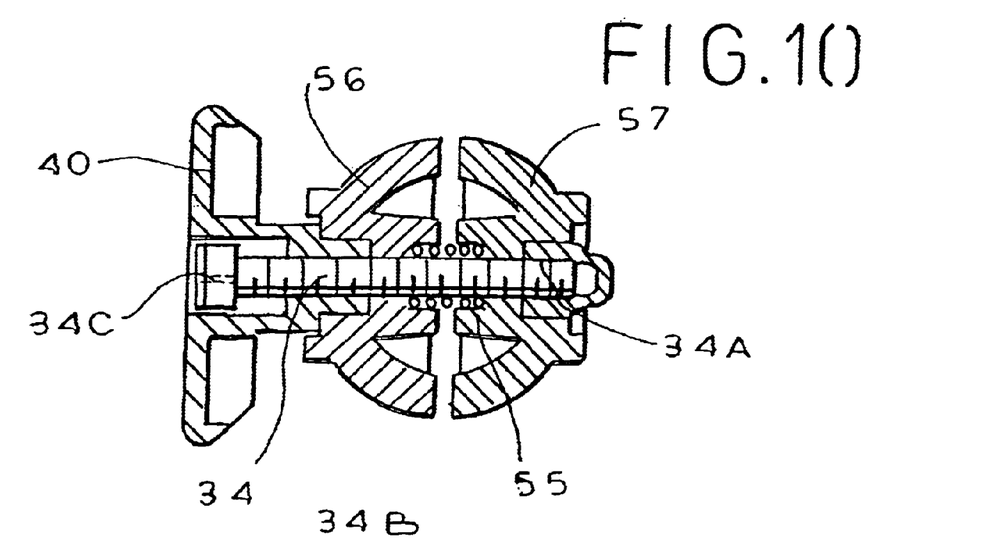
FIG. 10 is a sectional view similar to FIG. 9 showing the structure in closed condition.

FIG. 9 shows structure that corresponds to bosses 56, 57 of shells 20, 21 in FIG. 7, but shows a more detailed structure of the internal bosses now designated 56, 57. Other corresponding parts retain the same reference numbers, such as coil spring 55, bolt 34 and thumbscrew 40. Bolt 34 is threaded along its length, with threads 34A at the end engaging nut 36, and threads 34B at the head end engaging the bore of the thumbscrew. At the top end 34C of the bolt is a socket for receiving an Allen wrench.

As described earlier, initial rotation of the thumbscrew causes initial rotation of the bolt 34 into the nut 36 until the bolt bottoms tightly in the nut. Further, rotation of the thumbscrew or drive wheel 40 with respect to the now-anchored bolt draws the thumbscrew toward the nut, thus urging the two shells toward each other and tightly against the enclosed axially aligned pipe ends, with the dimples engaging the holes in the pipe walls. Also, as described earlier, coil spring 55 urges the shells apart, as seen in FIG. 9 so that the coupled pipe can be inserted when the connector is in open condition.

Although not shown herein, this connecting assembly could be adapted to couple pipes not in axial alignment and/or not of the same diameter.

Now that the preferred embodiments of the present invention have been shown and described in detail, various modifications and improvements thereon will become readily apparent to those skilled in the art. Accordingly, the spirit and scope of the present invention is to be limited only by the appended claims, and not by the foregoing specification.

I claim:

1. A pipe connector for releasably coupling adjacent ends of two axially aligned pipes, each of said pipes having an end part defining a cylindrical wall with a terminal end edge and a set of locking holes extending radially along an axis extending through said cylindrical wall, said axis situated axially inward of said terminal edges and transverse of the pipe's central longitudinal axis; said pipe connector comprising, when said coupled pipes extend vertically;

(A) a set of left and right shells which when assembled together generally define a split cylinder, split lengthwise about a central longitudinal plane, said shells having internal bore surfaces;
      (i) said left shell having a pair of dimples situated axially apart a distance L and extending radially inward from its bore surface, and a central hole extending through said wall and located axially intermediate said dimples,
      (ii) said right shell having one dimple extending radially inward from said bore surface of said shell and one further hole extending radially through said wall, said dimple and said further hole in said right shell being axially spaced apart said distance L, said right shell further including a central hole axially intermediate said further hole and said dimple in said right shell; and
   (B) fastening means extendable through said central holes for releasably clamping said shells tightly against said pipe ends when said left and right shells are positioned to form a concentric sleeve about said aligned and axially spaced apart pipe ends, with said dimples of the left shell engaging one locking hole of each of said pipes, and with said dimple of said right shell engaging one locking hole of one of said pipes and said further hole of said right sleeve aligned with one locking hole of one pipe and fixedly coupled thereto.

2. A pipe connector for releasably coupling adjacent ends of two first and second axially aligned pipes, comprising:

(A) said two pipes where each of said adjacent ends defines a cylindrical wall with an outer cylindrical surface and a terminal edge and where each of said adjacent ends has axially inward of its terminal edge a pair of lock holes extending radially through opposite sides of said cylindrical wall;
   (B) a joining clamp assembly comprising a set of left and right shells which when assembled together define a split cylinder split lengthwise about a central longitudinal plane, each of said shells defining a portion of a cylindrical wall that is generally concentric with and can lie closely adjacent the outer cylindrical surfaces of said axially aligned pipes;
      (i) said left shell further comprising a pair of dimples axially spaced apart and spaced axially inward from said terminal edge of said left shell, for extending into one of said lock holes of said first pipe and one of said lock holes of said second pipe, and a central fastening hole extending radially through the cylindrical wall and situated axially between said dimples of each shell;
      (ii) said right shell having a dimple extending radially inward and a central fastening hole situated adjacent said dimple and extending radially through said wall, said right shell being fixedly attached to said first pipe; and
   (C) fastening means extendable through said central fastening holes for releasably clamping said shells tightly against ends of said pipes with said dimples extending into corresponding lock holes in said pipes.

3. A pipe connector according to claim 2 wherein said fastening means comprises a bolt extending through said central holes of said shells.

4. A pipe connector according to claim 3 wherein said fastening means further comprises a coil spring having a bore through which said bolt extends, said coil spring having length in a relaxed state that is greater than the diametrical space between said shells in the direction of said bolt.

5. A pipe connector according to claim 2 wherein said fastening means comprises a strap that encompasses said top and bottom shells.

6. A pipe connector according to claim 3 wherein said fastening means comprises:

(A) an acorn nut with an internal bottom engaging an outer facing surface of said right shell; and (B) a bolt with external threads at one end for threadedly engaging said nut until said bolt end is tight against said nut bottom, a socket opening at the other end by which said bolt is rotatable into said nut bottom to a tight fit, and further external threads on said top end of said bolt, and a wingnut having a base dimensioned to press against said left shell and threadedly engaged to said top of said bolt, whereby rotation of said wingnut urges said left shell rightward while pulling said acorn nut and right shell leftward until said shells are tightly clamped against said ends of said pipes.

7. A pipe connector according to claim 2 wherein said right shell is secured to said first pipe by second fastening means.

8. A pipe connector according to claim 7 wherein said second fastening means is a nut and bolt.

9. A pipe connector according to claim 7 wherein said second fastening means is a rivet.

10. A pipe connector according to claim 7 wherein said second fastening means comprises adhesive.

11. A pipe connector according to claim 2 wherein one of said lock holes is located a different axial distance from said terminal edge then said other hole.

12. A pipe connector according to claim 2 wherein said lock holes are not centered between side edges of each shell.

13. A pipe connector according to claim 2 wherein said left and right shells each comprises a boss extending radially inward through which said central hole extends.

14. A pipe connector for releasably coupling adjacent ends of two first and second axially aligned pipes situated end-to-end and spaced apart each of said pipes having an end part defining a cylindrical wall with a terminal end edge and an axis-situated axially inward of said end edge and extending transversely through said wall and through a set of opposite lock holes in said wall, said pipe connector comprising:

(A) a set of first and second cylindrical shell segments, which when assembled together define a split cylinder split lengthwise about a central longitudinal plane with internal bore surfaces on each of said shell segments, a first of said shells having a pair of dimples extending radially inward from said bore surface and spaced apart an axial distance L;

said shell segments adapted to overlie said pipes, forming a concentric sleeve with said dimples extended from said sleeves into said lock holes in said pipes, with corresponding dimples of said two shell segments engaging said lock holes of said second pipe, and with said second dimple of said first shell segment engaging one lock hole of said first pipe;

(B) second fastener means fixedly securing said second shell segment to said first; and (C) a releasable fastening means engaging said second shell segment which allows said shells to be displaced from each other to allow entry of said lower pipe, and fastenable to draw said shell segments into close engagement with said pipes to preclude one from a axial movement relative to the other.

* * * * *